United States Patent
Rang et al.

(10) Patent No.: US 7,595,749 B2
(45) Date of Patent: Sep. 29, 2009

(54) METHOD AND DEVICE FOR RELATIVE TIME AND POSITION DETERMINATION FOR MOVING OBJECTS BASED ON ONE-WAY AND TWO-WAY MEASUREMENTS

(75) Inventors: Tanja Rang, Grasbrunn (DE); Hans L. Trautenberg, Ottobrunn (DE)

(73) Assignee: EADS Astrium GmbH, Munich (DE)

( * ) Notice: Subject to any disclaimer, the term of this patent is extended or adjusted under 35 U.S.C. 154(b) by 126 days.

(21) Appl. No.: 11/802,074

(22) Filed: May 18, 2007

(65) Prior Publication Data

US 2007/0273579 A1 Nov. 29, 2007

(30) Foreign Application Priority Data

May 29, 2006 (DE) .................. 10 2006 025 250

(51) Int. Cl.
*G01S 1/00* (2006.01)
*G01C 21/00* (2006.01)
*G05D 1/02* (2006.01)
*H04B 7/19* (2006.01)

(52) U.S. Cl. .................. 342/357.01; 701/226; 701/300; 455/13.2

(58) Field of Classification Search ............ 342/357.01; 701/226, 300; 455/13.2
See application file for complete search history.

(56) References Cited

U.S. PATENT DOCUMENTS

| 5,563,880 | A | * | 10/1996 | Sabourin et al. ............ 370/312 |
| 5,957,409 | A | * | 9/1999 | Castiel et al. ............ 244/158.4 |
| 6,300,904 | B1 | | 10/2001 | Dvorak et al. |
| 6,535,801 | B1 | | 3/2003 | Geier et al. |
| 7,362,262 | B2 | * | 4/2008 | Murphy ................ 342/357.01 |
| 2003/0035500 | A1 | | 2/2003 | Jin |
| 2004/0075044 | A1 | | 4/2004 | Hunt |
| 2004/0193373 | A1 | | 9/2004 | Beauregard et al. |

FOREIGN PATENT DOCUMENTS

| CA | 2255127 A1 | 8/1999 |
| EP | 0 887 656 B1 | 12/1998 |

OTHER PUBLICATIONS

European Search Report dated Sep. 27, 2007 with English translation of relevant portions (ten (10) pages).

* cited by examiner

*Primary Examiner*—Thomas H Tarcza
*Assistant Examiner*—Harry Liu
(74) *Attorney, Agent, or Firm*—Crowell & Moring LLP

(57) ABSTRACT

In a method for relative time and position determinations for moving objects of a constellation, signals by the objects are isochronously transmitted, with each object transmitting a unique signal for that object. The received signals of each object of the constellation are transmitted to all other objects of the constellation after a predetermined waiting time.

10 Claims, 1 Drawing Sheet

Figure 1:
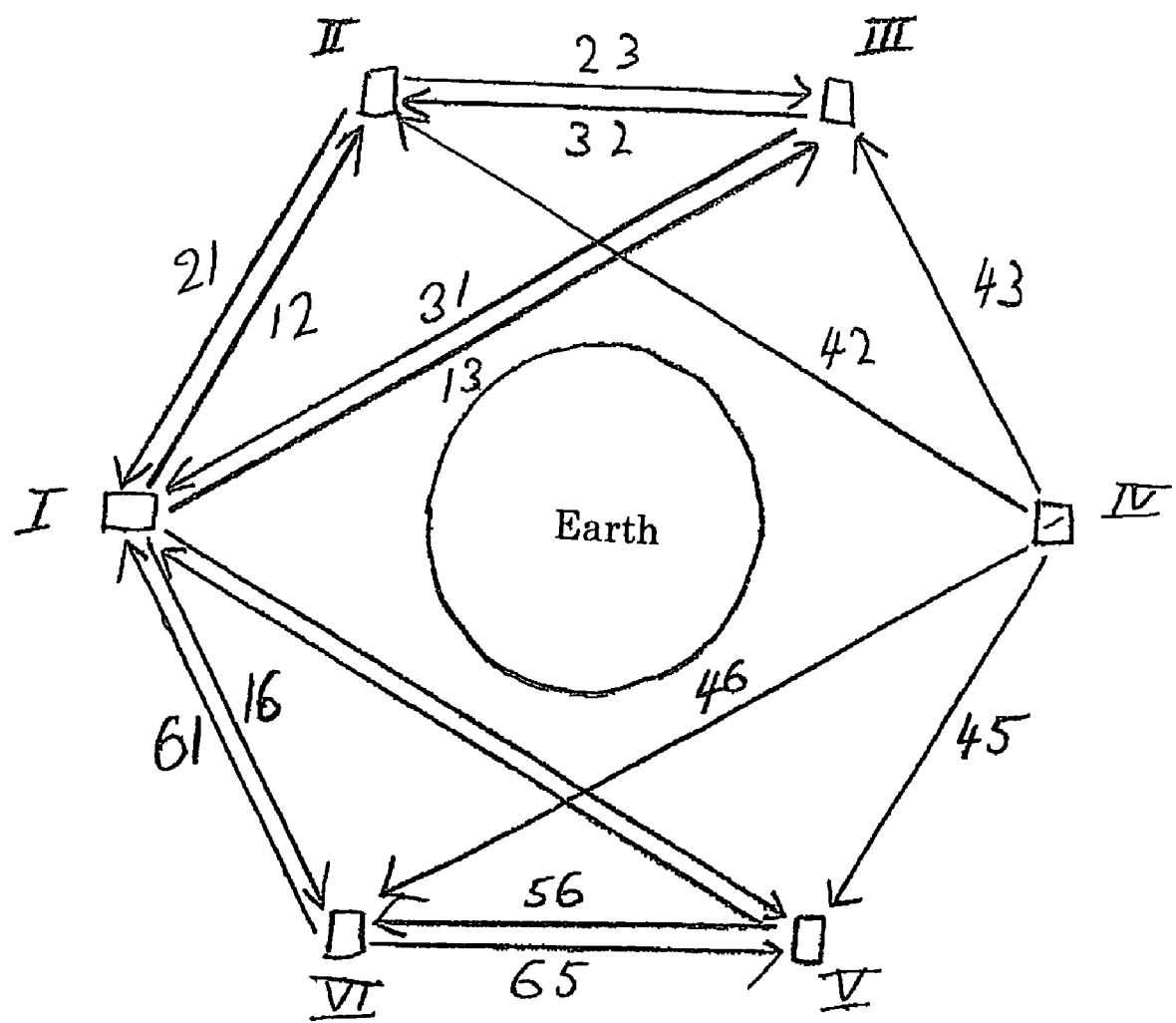

METHOD AND DEVICE FOR RELATIVE TIME AND POSITION DETERMINATION FOR MOVING OBJECTS BASED ON ONE-WAY AND TWO-WAY MEASUREMENTS

This application claims the priority of German application 10 2006 025 250.0, filed May 29, 2006, the disclosure of which is expressly incorporated by reference herein.

BACKGROUND AND SUMMARY OF THE INVENTION

This invention relates to a method and a device for relative time and position determination for moving objects based on one-way and two-way measurements.

If links between satellites of a constellation are to be used for distance measurement and thus for position determination and clock synchronization, then the measurement results must be transmitted among the satellites of the constellation, if the satellites are supposed to autonomously estimate the orbits and clocks. In a GPS (global positioning system), for example, a signal is sent from one satellite to all the other satellites of the system, and the respective arrival time of the signals is determined in the receiving satellites. These measurement results are digitized in the respective receiving satellites and then sent back as a numerical value to the satellites originally sending the signals.

This procedure has the disadvantage that either relatively high data rates are needed for transmission of the digitized measurement results or there are long intervals of time between two successive orbit or clock determinations.

One object of the present invention is to provide a method and a device for determining the orbits and clocks of satellites which do not have any of the above disadvantages.

This object is achieved by way of a method or a device for relative time and position determinations for moving objects of a constellation in which signals are isochronously transmitted by the objects of the constellation such that each object transmits a unique signal for that object, and signals received by each object of the constellation are transmitted to all other objects of the constellation after a predetermined waiting time, with the waiting time being predetermined individually for each object.

One advantage of the inventive method is that in this way each satellite of the constellation receives a two-way measurement with each satellite of the constellation, to which it is sent back directly, and two combined one-way measurements via another satellite with all the other satellites of the constellation without having to transmit measured values as digital data among the satellites. No measured values need be transmitted because all necessary measured data are generated directly at the receiving satellite from the measurements on the satellite itself and the stipulated nominal sending points in time to the satellites and/or the stipulated waiting times until resending the received signals, which are emitted by each satellite at the start of each measurement period.

With the inventive method, it is thus no longer necessary to transmit digitized measurement data. However, if no more data need be transmitted, it is possible for the transmission to be at a much lower power level and/or to perform measurements with a much better precision at the same power level.

BRIEF DESCRIPTION OF THE DRAWING FIGURE

FIG. 1 shows a satellite constellation.

DETAILED DESCRIPTION OF THE INVENTION

There follows a description of one embodiment of the present invention.

All satellites simultaneously send a signal (spread-code-coded signal identifying each individual satellite unambiguously). Therefore, all the satellites can send the signals simultaneously to all the other satellites by using spread codes, each of which is different and is known to the recipient. By means of the spread codes of the other satellites, which are known to the satellite, the receiving satellite is able to decode the signals and ascertain which signal was sent from which transmitting satellite.

These signals are transmitted so briefly that they are already definitely concluded before the arrival of these signals at any satellite. Definitely concluded in this context means that until the arrival of the first signal transmitted by another transmitter at the start of a measurement period, the components that are used for sending the signal transmit so little that it is still possible to receive the signals emitted by the other transmitters. This maximal transmission time is determined by the shortest distance between a transmitter and a receiver between which the distance is to be determined. In a satellite constellation with intersecting orbital paths, it may thus happen that the distance between many satellites cannot be determined by direct one-way and two-way measurements because of their short distance. Then only indirect one-way measurements via another satellite can be used.

In other words, the signal duration is shortened to the extent that the maximal signal duration of the signals involved, which are sent by the satellites, is essentially shorter than the minimal transit time of the signals involved within the satellites involved.

FIG. 1 shows the situation in which satellite I has two-way measurements and direct one-way measurements with satellites II, III, V and VI. Furthermore, satellite I has indirect one-way measurements from satellite II via satellite III, from satellite III via satellite II, from satellite IV via satellite III, from satellite IV via satellite II, from satellite IV via satellite V, from satellite IV via satellite VI, from satellite V via satellite VI and from satellite VI via satellite V.

These signals are then received by all the satellites. Each satellite sends the received signal back to all the other satellites after a waiting time which is predetermined for each individual satellite. The waiting time is such that all the satellites can always receive only the signals sent back from one satellite. In other words, the waiting time of a satellite is selected so that only the returned signals of one satellite of the satellite constellation are underway in an interval of time between the waiting time plus the shortest transit time of the signals within the satellite constellation and the waiting time plus the longest transit time of the signals within the satellite constellation.

The inventive method thus comprises the steps of isochronous signal transmission by the satellites of the constellation, in which each satellite transmits a signal that is unique for that satellite. Then, after a predetermined waiting time, the received signals are sent by each satellite of the constellation to all the other satellites of the constellation. Furthermore, the received signals, which have already been received once by another satellite of the constellation and sent back, are sent to all the other satellites of the constellation after a predetermined waiting time.

The invention also relates to a device which is equipped for the inventive method.

The inventive method and the inventive device have been described in connection with a satellite constellation. However, this is just one example. This invention is suitable for all constellations in which relative time and position determinations can be performed for moving objects on the basis of one-way and two-way measurements.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for transmitting and receiving signals among moving objects of a constellation, comprising:
   determining a maximum permissible signal transmission time from a shortest distance between said objects of the constellation,
   sending a unique coded signal from one object of the constellation simultaneously with unique coded signals from the other objects of the constellation,
   concluding transmission of each of the unique coded signals within said maximum permissible signal transmission time,
   receiving the unique coded signals from said other objects of the constellation at said one object, and
   decoding the unique coded signals received to ascertain which of said other objects of the constellation sent each of the unique coded signals.

2. The method as claimed in claim 1, further comprising transmitting received signals, which have already been received once by another object of the constellation and resent to all other objects of the constellation, after a predetermined waiting time.

3. The method as claimed in claim 1, wherein decoding said coded signals is achieved by spread code decoding.

4. The method as claimed in claim 1, wherein the objects of the constellation are satellites of a satellite constellation.

5. The method as claimed in claim 2, wherein the waiting time is predetermined individually for each object.

6. The method as claimed in claim 2, wherein the waiting time is of a length such that the other objects of the constellation can always receive only the signals sent back from said one object.

7. The method as claimed in claim 2, wherein decoding said coded signals is achieved by spread code decoding.

8. The method as claimed in claim 2, wherein the objects of the constellation are satellites of a satellite constellation.

9. The method as claimed in claim 3, wherein the objects of the constellation are satellites of a satellite constellation.

10. The method as claimed in claim 6, wherein the objects of the constellation are satellites of a satellite constellation.

* * * * *